(12) United States Patent
Fay et al.

(10) Patent No.: US 11,858,428 B2
(45) Date of Patent: Jan. 2, 2024

(54) MOUNTING KIT AND METHOD FOR INSTALLING A SOUNDBAR IN A VEHICLE

(71) Applicant: Harman International Industries, Incorporated, Stamford, CT (US)

(72) Inventors: Jeffery Fay, Stamford, CT (US); Kai Meng, ShenZhen (CN); Linghua Jiang, ShenZhen (CN)

(73) Assignee: Harman International Industries, Incorporated, Stamford, CT (US)

( * ) Notice: Subject to any disclaimer, the term of this patent is extended or adjusted under 35 U.S.C. 154(b) by 210 days.

(21) Appl. No.: 17/365,248

(22) Filed: Jul. 1, 2021

(65) Prior Publication Data
US 2023/0001861 A1    Jan. 5, 2023

(51) Int. Cl.
| B60R 11/02 | (2006.01) |
| H04R 1/02 | (2006.01) |
| B60R 11/00 | (2006.01) |

(52) U.S. Cl.
CPC .......... B60R 11/0217 (2013.01); H04R 1/025 (2013.01); *B60R 2011/0003* (2013.01); *B60R 2011/008* (2013.01); *B60R 2011/0052* (2013.01); *B60R 2011/0059* (2013.01)

(58) Field of Classification Search
CPC ......... B60R 11/0217; B60R 2011/0003; B60R 2011/0052; B60R 2011/0059; B60R 2011/008; H04R 1/025
See application file for complete search history.

(56) References Cited

U.S. PATENT DOCUMENTS

| 10,486,613 | B2 * | 11/2019 | White | H04R 1/403 |
| 11,223,886 | B1 * | 1/2022 | Fadul | H04R 1/023 |
| 2004/0079779 | A1 * | 4/2004 | Essig | B60R 9/00 224/558 |
| 2016/0362063 | A1 * | 12/2016 | McFadden | B60R 9/058 |

(Continued)

FOREIGN PATENT DOCUMENTS

| CN | 202856890 U | * | 4/2013 | |
| CN | 209162702 U | * | 7/2019 | |
| WO | WO-2021188811 A1 | * | 9/2021 | F16M 11/041 |

OTHER PUBLICATIONS

Maxxsonics Hifonics thor sound bar boat mount on youtube dated Aug. 2, 2016, https://www.youtube.com/watch?v=IDV2b5luXyE (Year: 2016).*

(Continued)

*Primary Examiner* — Terrell L McKinnon
*Assistant Examiner* — Ding Y Tan
(74) *Attorney, Agent, or Firm* — Brooks Kushman P.C.

(57) ABSTRACT

A mounting kit for installing a soundbar in a vehicle includes a tube having an elongated body and at least one chamber having a window. The mounting kit includes at least one bolt having a head and a shank, the head arranged to be coupled to the soundbar and the shank arranged to be received in the at least one chamber and accessible through the window to secure the soundbar to the tube. A first bracket is arranged to be secured to a cross member and first pillar of the vehicle, and a second bracket is arranged to be secured to the cross member and a second pillar of the vehicle, each of the first and second brackets having a cradle arranged to receive an end portion of the tube for installing the tube and attached soundbar in the vehicle.

20 Claims, 13 Drawing Sheets

(56) References Cited

U.S. PATENT DOCUMENTS

2017/0203702 A1* 7/2017 Horgen .................. B60R 11/06
2022/0303650 A1* 9/2022 Jenkins ................. H04R 1/403

OTHER PUBLICATIONS

Masek Rocky Mountain golf cars youtube video "Ecoxgear sound extreme sound bar" dated Feb. 10, 2021, https://www.youtube.com/watch?v=0oAa4Pz4vnM (Year: 2021).*
JBL UB4100 amplified powersports soundbar owner's manual dated Aug. 5, 2017, (Year: 2017).*
Kbrotech bike handlebar mount holder sold on amazon dated Jun. 27, 2017, https://www.amazon.com/Kbrotech-Handlebar-Extender-Extension-Aluminum/dp/B077XJ1W97 (Year: 2017).*
Wet sounds stealth 6 sound bar install on golf cart youtube video dated Jan. 30, 2015 by DIY golf cart, https://www.youtube.com/watch?v=H4dapBisqZs (Year: 2015).*
Luisttris OEM styled screw bolts for Jeep for brackets on pillars and frames sold on amazon.com, dated Aug. 18, 2020, https://www.amazon.com/OEM-Style-2007-2018-Wrangler-Brackets-Windshield/dp/B0BDLS6539 (Year: 2020).*
Boss Audio UTV sound bar turn it up by UTV driver online article, dated Oct. 13, 2016, https://www.utvdriver.com/boss-audio-utv-sound-bar/ (Year: 2016).*
Kuryakyn 2723 vehicle Mount Kit for WanderBar Portable Soundbar sold on amazon.com, dated Apr. 30, 2021, https://www.amazon.com/Kuryakyn-2723-Recreational-Motorcycle-WanderBar/dp/B093XZSV1G?th=1 (Year: 2021).*
JBL by Harman, "Stadium UB4100 Amplified Powersports Soundbar", Owner's Manual, Aug. 5, 2017, 8 pages.

* cited by examiner

MOUNTING KIT AND METHOD FOR INSTALLING A SOUNDBAR IN A VEHICLE

TECHNICAL FIELD

Embodiments relate to a mounting kit and method for installing a soundbar in a vehicle.

BACKGROUND

Soundbars are a type of sound system with multiple speakers housed side-by-side in a single wide enclosure which creates a stereo or surround sound effect. Soundbars are often used in home audio and media applications, but may also be used in vehicles such as cars, off-road vehicles, and boats to improve the quality of audio. Soundbars typically include both tweeters and woofers and thus provide a cost-effective, all-in-one solution for creating a surround sound experience without requiring multiple separate speakers.

Soundbars can be installed in a vehicle behind the rear seats, in the trunk, under the seat, and even on top of the vehicle. Behind the rear seats, a soundbar may be mounted to a roll bar or another cross member on a roll cage frame, for example. Soundbars must be mounted appropriately to maintain safety thresholds for crash impacts, so as not to encroach upon head space for rear seat passengers. However, in order to meet these safety standards and remain sufficiently spaced from the rear seat headrests and passengers, previous soundbar mounting structures designed to clamp around the roll bar or roll cage may undesirably contact the hard top of a vehicle or deform and stretch a soft top of the vehicle.

SUMMARY

In one or more embodiments, a mounting kit for installing a soundbar in a vehicle is provided, the vehicle having a roll cage including a cross member and a first pillar and a second pillar connected to opposite ends of the cross member. The mounting kit includes a tube having an elongated body, the tube including at least one chamber having a window. The mounting kit further includes at least one bolt having a head and a shank, the head arranged to be coupled to the soundbar and the shank arranged to be received in the at least one chamber and accessible through the window to secure the soundbar to the tube. A first bracket is arranged to be secured to the cross member and to the first pillar, and a second bracket is arranged to be secured to the cross member and the second pillar, each of the first and second brackets having a cradle arranged to receive an end portion of the tube for installing the tube and attached soundbar in the vehicle.

In one or more embodiments, the mounting kit further includes an adjustment cap arranged to be received on the shank within the at least one chamber, wherein the adjustment cap is adjustable by engaging the adjustment cap through the window. In one or more embodiments, the end portion has one or more end portion apertures formed therein and the cradle has one or more cradle apertures formed therein, the cradle apertures arranged to be aligned with the end portion apertures for receiving fasteners and securing the tube to the first bracket and the second bracket.

In one or more embodiments, the first bracket is a left bracket and the second bracket is a right bracket, where the second bracket is a mirror image of the first bracket. In one or more embodiments, the first bracket and the second bracket each have an inboard portion including a plate with a top end having one or more plate apertures for receiving fasteners to secure the inboard portion to the cross member, and a bottom end including the cradle. In one or more embodiments, the first bracket and the second bracket each have an outboard portion including a clamp having a first arm and a second arm connected by a hinge, wherein the first arm and the second arm are generally C-shaped and define a cavity therebetween, wherein the first and second arms are arranged to receive fasteners to secure the clamp around the first pillar or the second pillar. In one or more embodiments, the tube includes a notch formed in a bottom surface of the body and arranged to receive speaker wires from the soundbar.

In one or more embodiments, a soundbar assembly for a vehicle is provided, the vehicle having a roll cage including a cross member and a first pillar and a second pillar connected to opposite ends of the cross member. The soundbar assembly includes a soundbar having a housing with at least one track formed therein and a mounting kit including a tube having an elongated body, the tube including at least one chamber having a window. The mounting kit further includes at least one bolt having a head and a shank, the head arranged to be received within and slidable along the at least one track, and the shank arranged to be received in the at least one chamber and accessible through the window to attach the soundbar to the tube. A first bracket is arranged to be secured to the cross member and to the first pillar, and a second bracket is arranged to be secured to the cross member and the second pillar, each of the first and second brackets having a cradle arranged to receive an end portion of the tube for installing the tube and attached soundbar in the vehicle.

In one or more embodiments, a method for installing a soundbar in a vehicle is provided, the vehicle having a roll cage including a cross member and a first pillar and a second pillar connected to opposite ends of the cross member. The method includes providing a mounting kit including a tube having an elongated body and at least one chamber having a window, at least one bolt having a head and a shank, and a first bracket and a second bracket each having a cradle. The method further includes coupling the head of the bolt to the soundbar and inserting the shank into the at least one chamber to secure the soundbar to the tube. The method further includes securing the first bracket to the cross member and the first pillar and securing the second bracket to the cross member and the second pillar, and inserting end portions of the tube into the cradles of the mounted first and second brackets to install the tube and attached soundbar in the vehicle.

In one or more embodiments, the method further includes providing an adjustment cap on the shank within the at least one chamber and adjusting the adjustment cap via the window to secure the soundbar to the tube. In one or more embodiments, the method further includes aligning end portion apertures with cradle apertures for receiving fasteners and securing the tube to the first bracket and the second bracket. In one or more embodiments, the first bracket and the second bracket each have an inboard portion including a plate and the cradle and an outboard portion including a clamp having a first arm and a second arm connected by a hinge, wherein securing the first bracket and the second bracket includes securing the plate to the cross member and securing the clamp to the first pillar or the second pillar. In one or more embodiments, the tube includes a notch formed in a bottom surface of the body, the method further including receiving speaker wires from the soundbar in the notch permitting rotation of the soundbar while assembled to the tube. In one or more embodiments, the method further includes removing a plurality of factory fasteners and installing the first bracket and the second bracket at prior locations of the plurality of factory fasteners.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
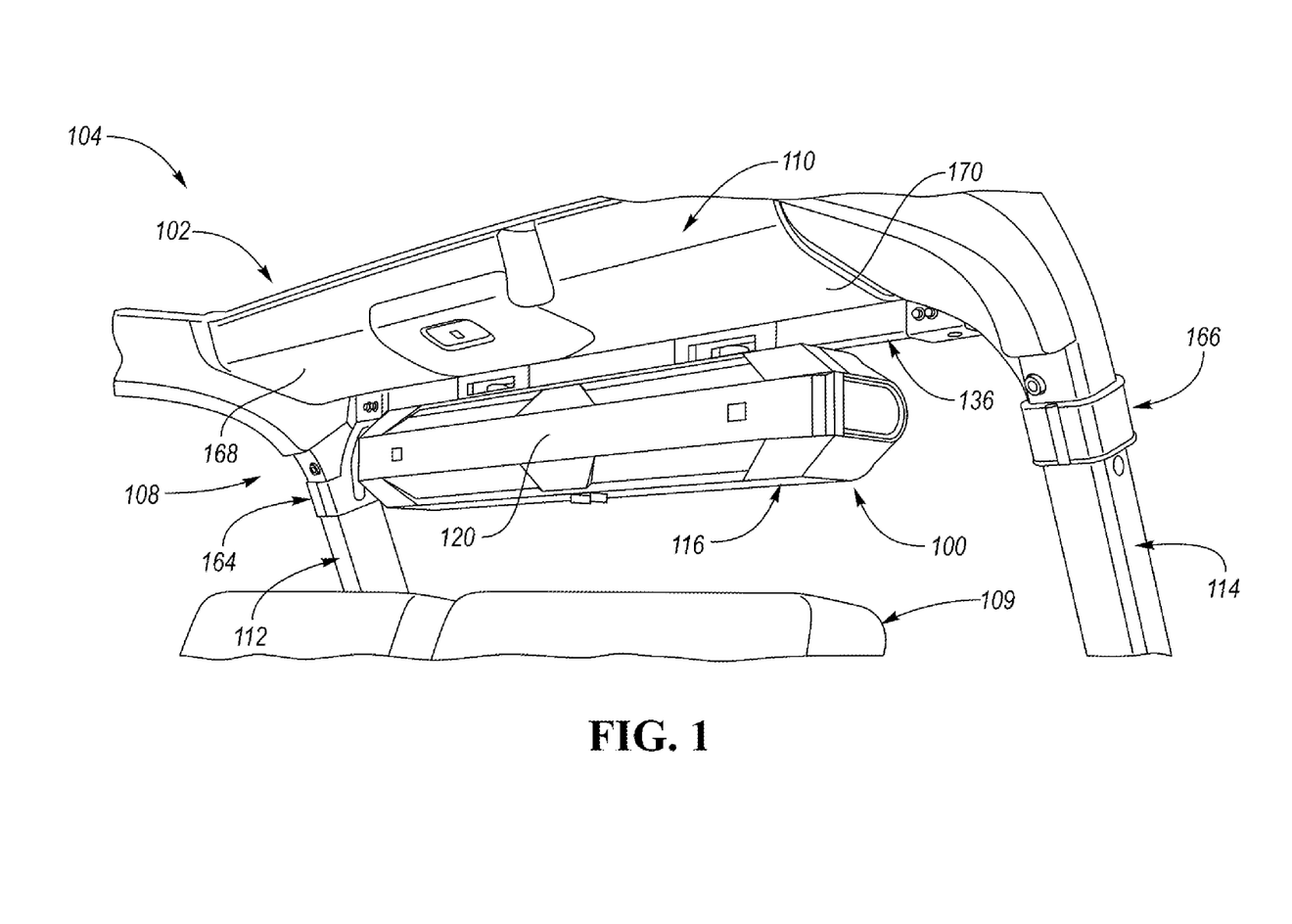
FIG. 1 is a perspective view of a soundbar secured to a roll cage of an exemplary first vehicle with a mounting kit according to one or more embodiments.
Figure 2:
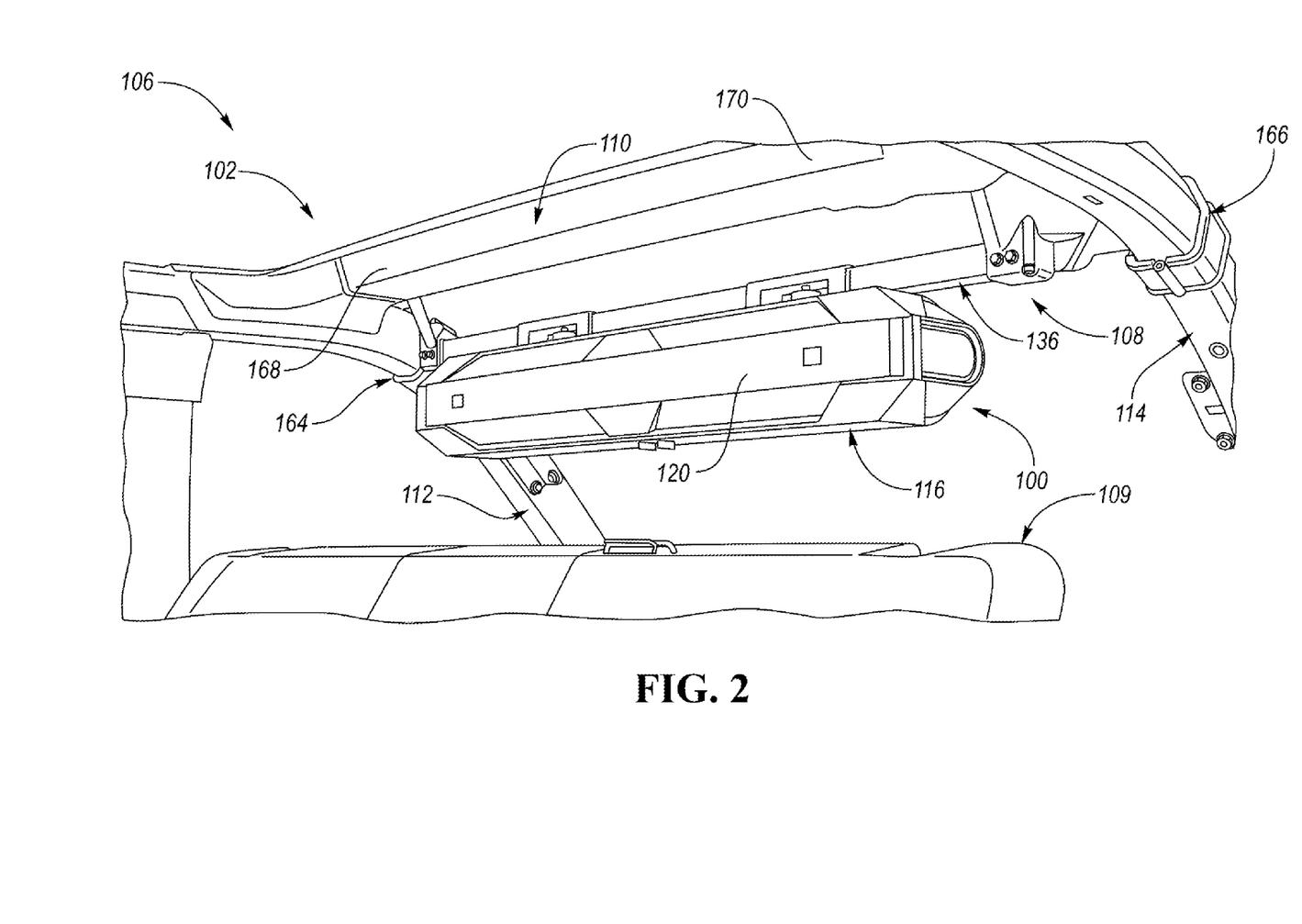
FIG. 2 is a perspective view of a soundbar secured to a roll cage of an exemplary second vehicle with a mounting kit according to one or more embodiments.

With reference first to FIGS. 1 and 2, perspective views of a soundbar 100 secured to a frame, such as a roll cage 102, of an exemplary first vehicle 104 and an exemplary second vehicle 106, respectively, with a mounting kit 108 according to one or more embodiments are illustrated. In one example, the mounting kit 108 is arranged to be installed in the cargo compartment of a vehicle behind and spaced from the rear seats 109. In each vehicle 104, 106, the roll cage 102 may have a generally horizontal cross member 110. The roll cage 102 may further include a first pillar 112 and a second pillar 114 connected to opposite ends of the cross member 110 and extending generally vertically downward therefrom. For example, the first and second pillars 112, 114 may be the C pillars of the first and second vehicles 104, 106. In a non-limiting embodiment, the first vehicle 104 may be a 3-door vehicle and the second vehicle 106 may be a 5-door vehicle. Of course, other vehicles besides the exemplary first and second vehicles 104, 106 illustrated herein are fully contemplated.

In one non-limiting example, the soundbar 100 may have dimensions of approximately 30 inches in length, approximately 6 inches in width, and approximately 5 inches in height. In one or more embodiments, the soundbar 100 may be equipped to handle audio from Bluetooth, 3.5 mm line out or RCA output jacks, USB or HDMI cables, digital optical audio or coaxial cables. The soundbar 100 may be coupled to an existing audio system of a vehicle when installed therein, or could also be hardwired into the vehicle audio system. The soundbar 100 and mounting kit 108 may be configured as an aftermarket option that is installed after manufacture of the vehicle. Alternatively, the soundbar 100 and the mounting kit 108 described herein may be installed in a vehicle while the vehicle is being manufactured.

Figure 3:
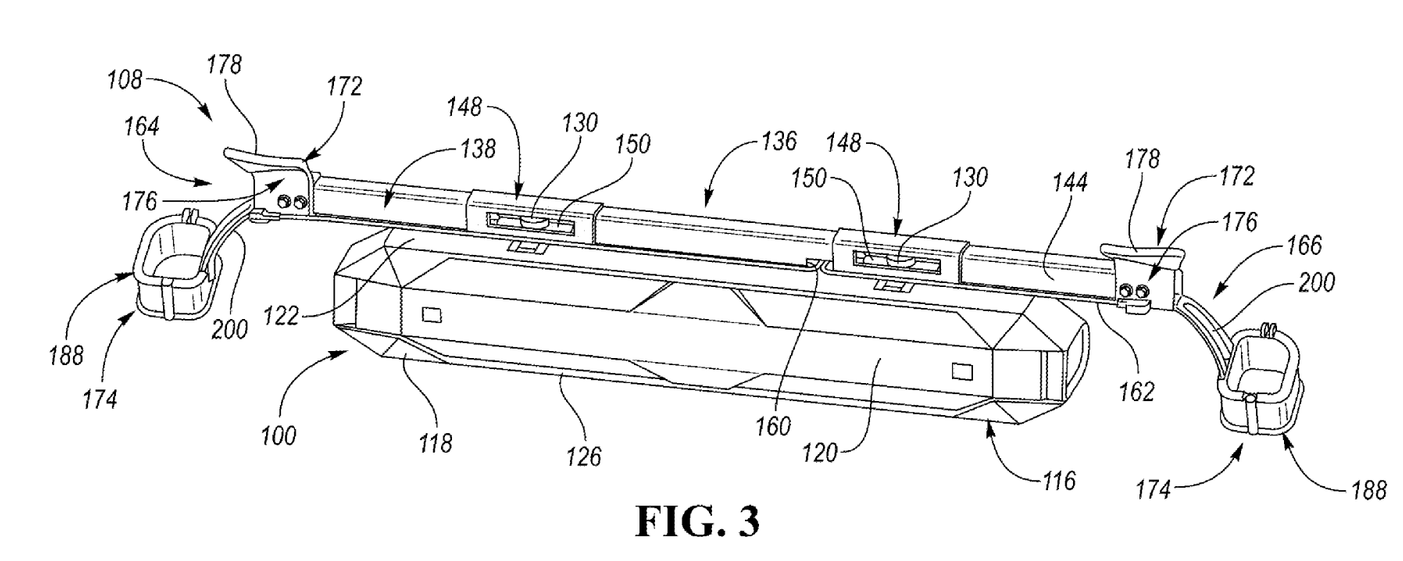
FIG. 3 is a front perspective view of a mounting kit with an attached soundbar for the first vehicle according to one or more embodiments.
Figure 4:
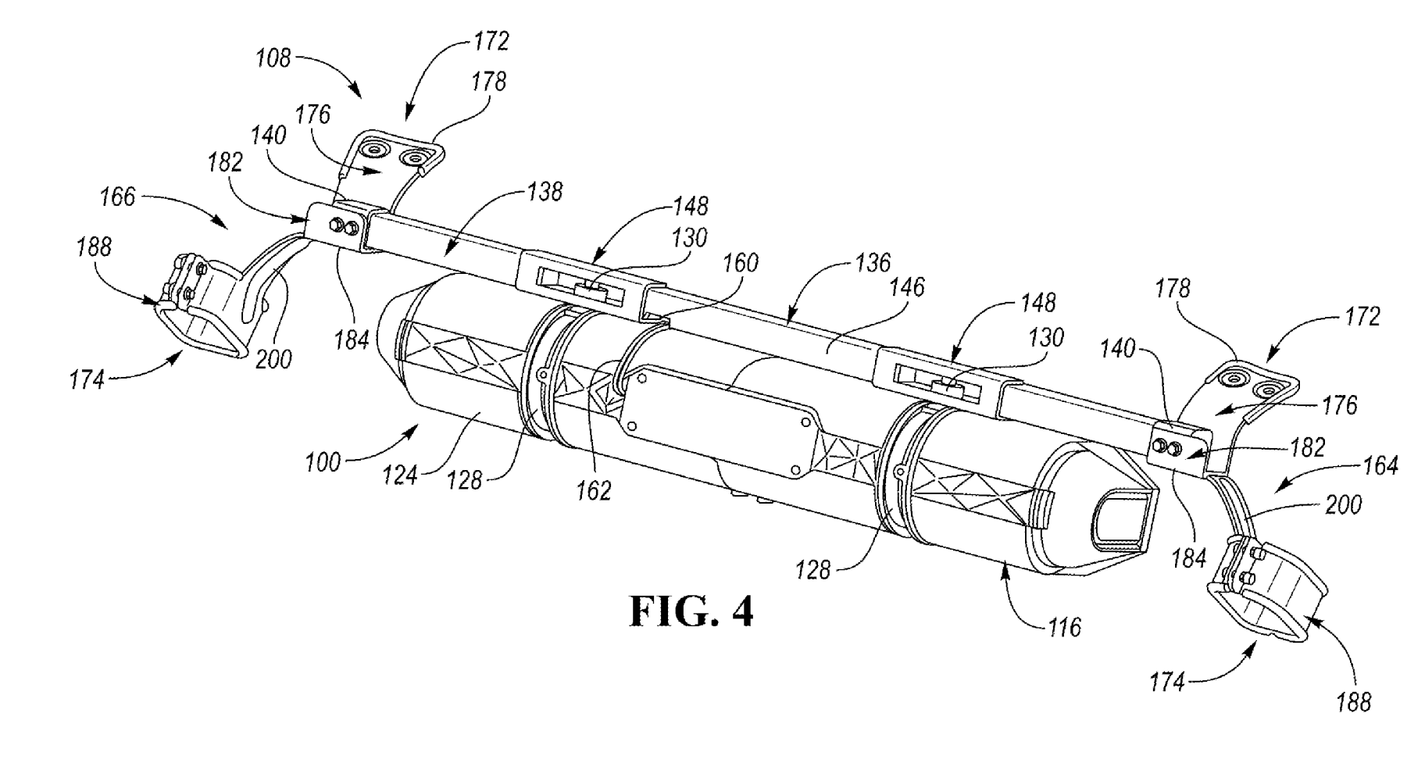
FIG. 4 is a rear perspective view of the mounting kit and attached soundbar for the first vehicle.
Figure 5:
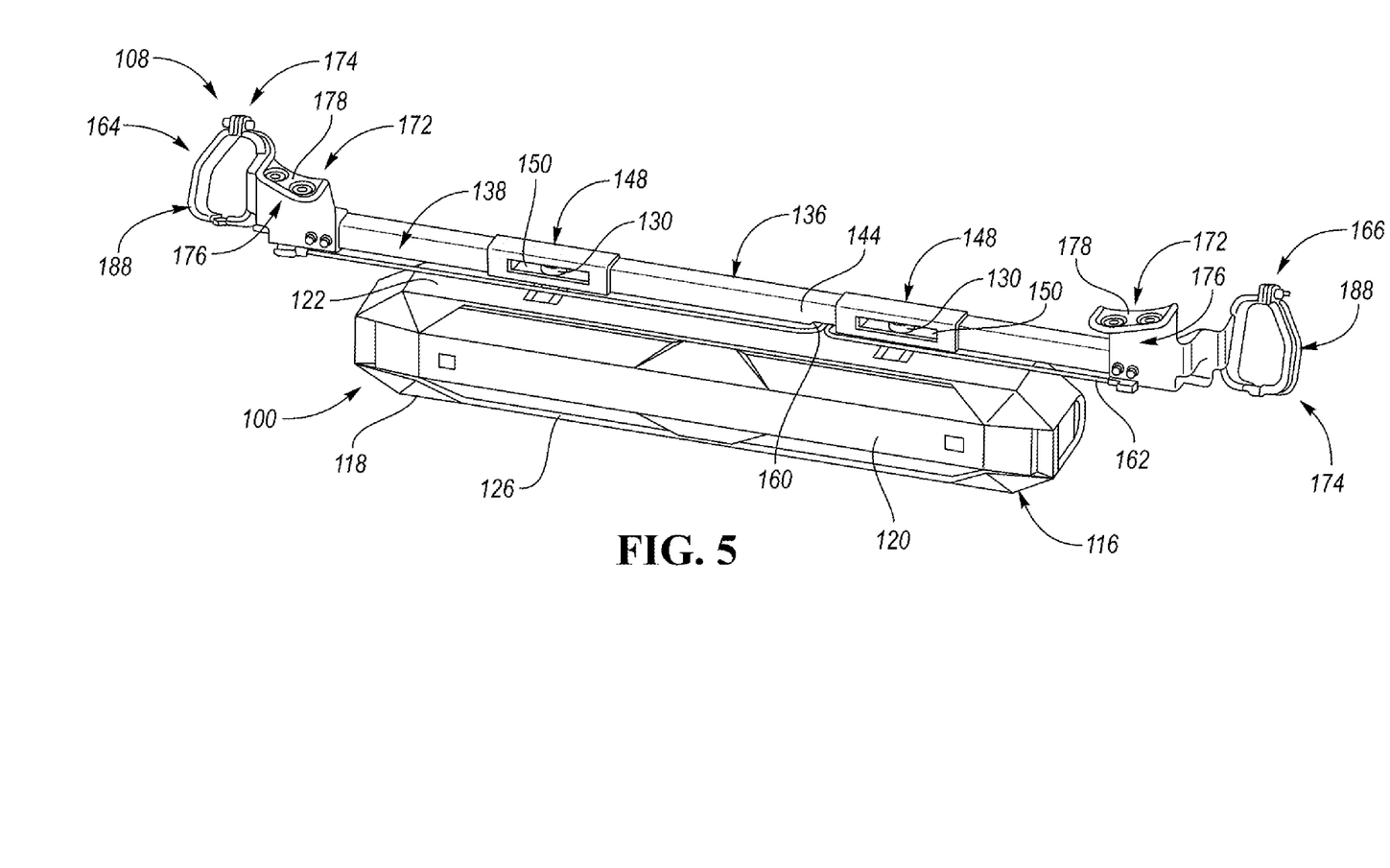
FIG. 5 is a front perspective view of a mounting kit and attached soundbar for the second vehicle according to one or more embodiments.
Figure 6:
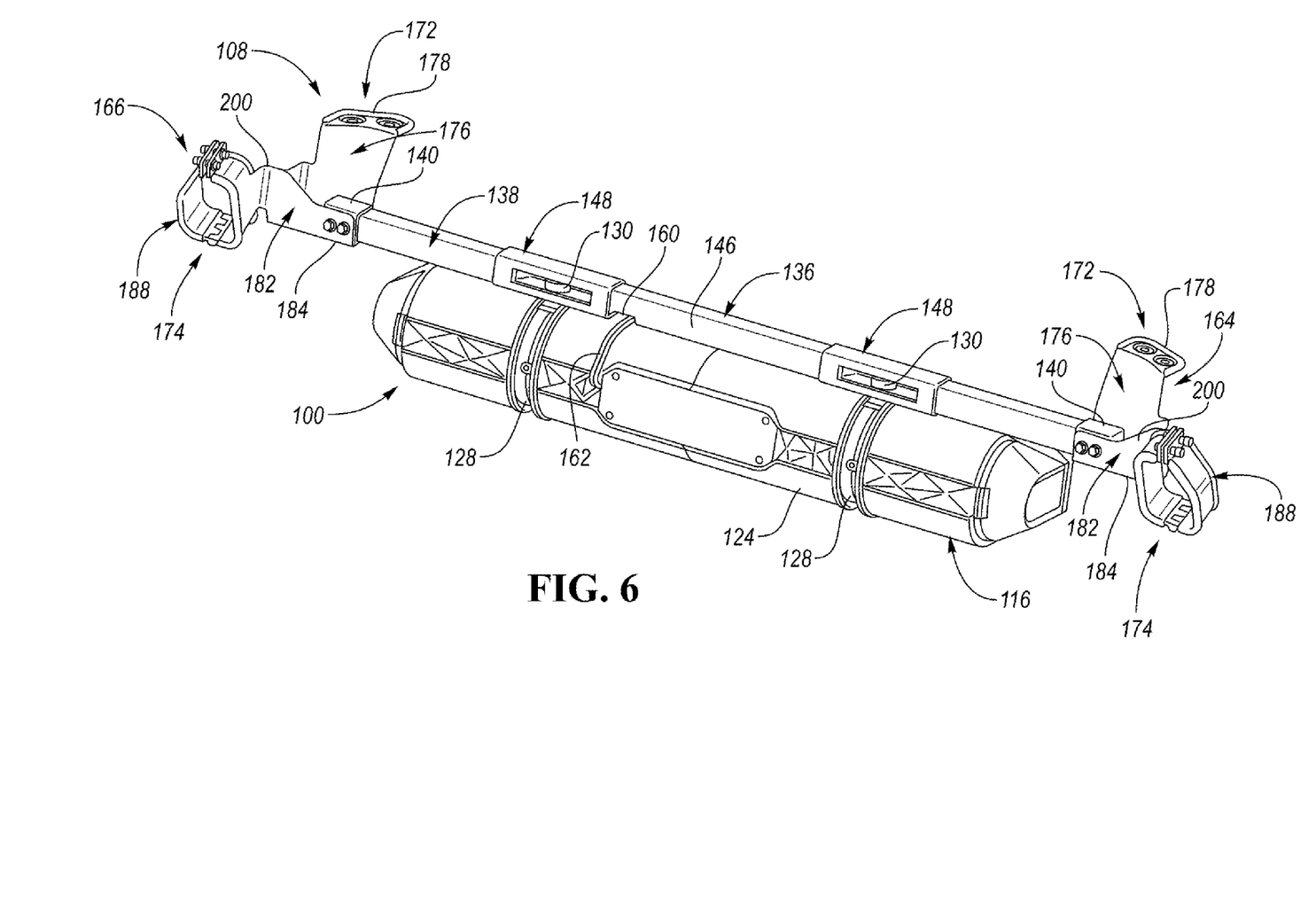
FIG. 6 is a rear perspective view of the mounting kit and attached soundbar for the second vehicle.

FIGS. 3 and 4 are front and rear perspective views, respectively, of the assembled soundbar 100 and mounting kit 108 adapted for installation in the exemplary first vehicle 104 according to one or more embodiments, and FIGS. 5 and 6 are front and rear perspective views, respectively, of the assembled soundbar 100 and mounting kit 108 adapted for installation in the exemplary second vehicle 106 according to one or more embodiments. The assembled soundbar 100 and mounting kit 108 may be referred to as a soundbar assembly. The components of the mounting kit 108 may be constructed from an SPCC (cold rolled, carbon steel) material, and may be designed to coordinate with the soundbar 100 and vehicle interior for an integrated appearance. The soundbar 100 and the various components of the mounting kit 108 are described further below with reference to FIGS. 7-12.

Figure 7:
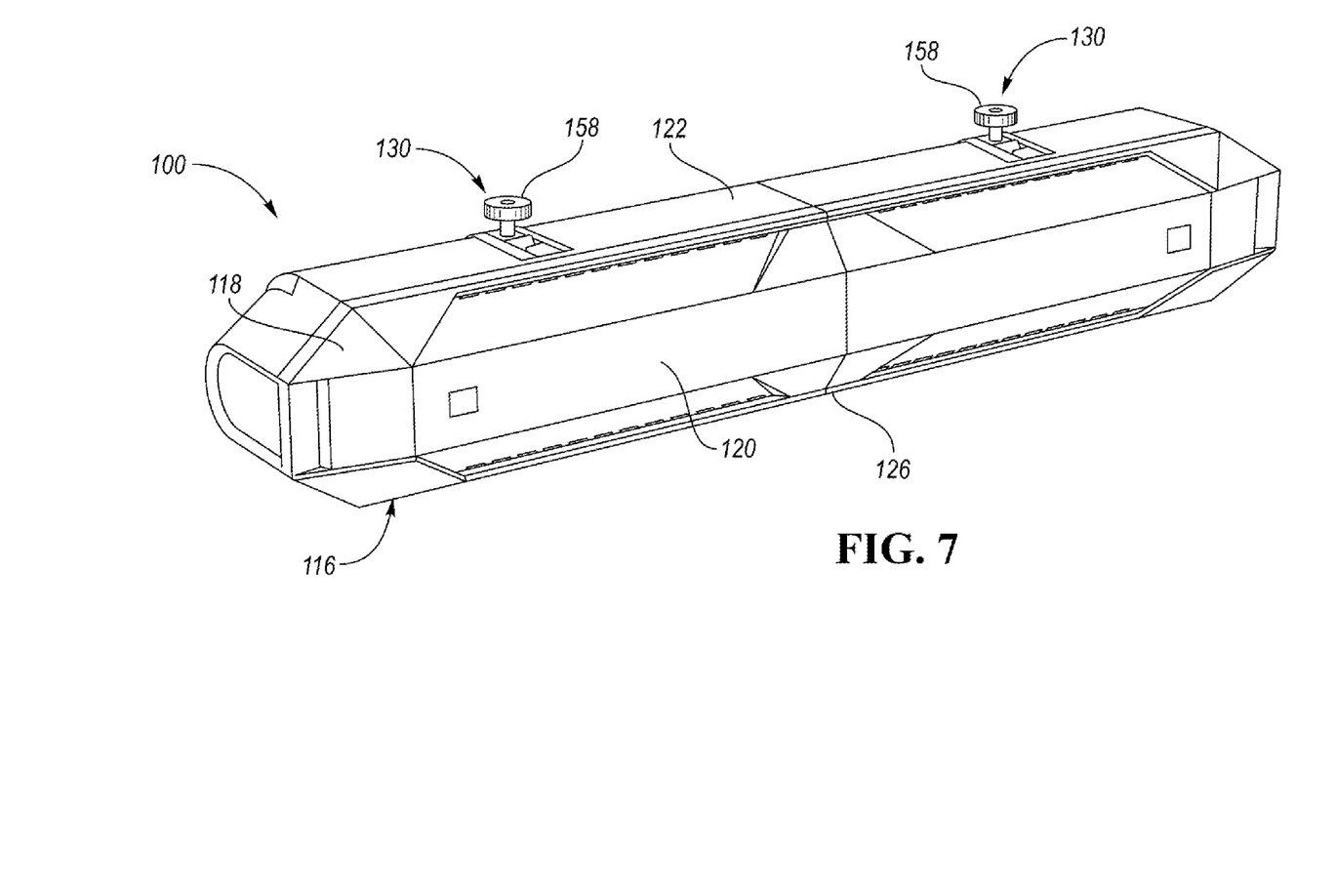
FIG. 7 is a front perspective view of a soundbar according to one or more embodiments with bolts received in the housing.
Figure 8:
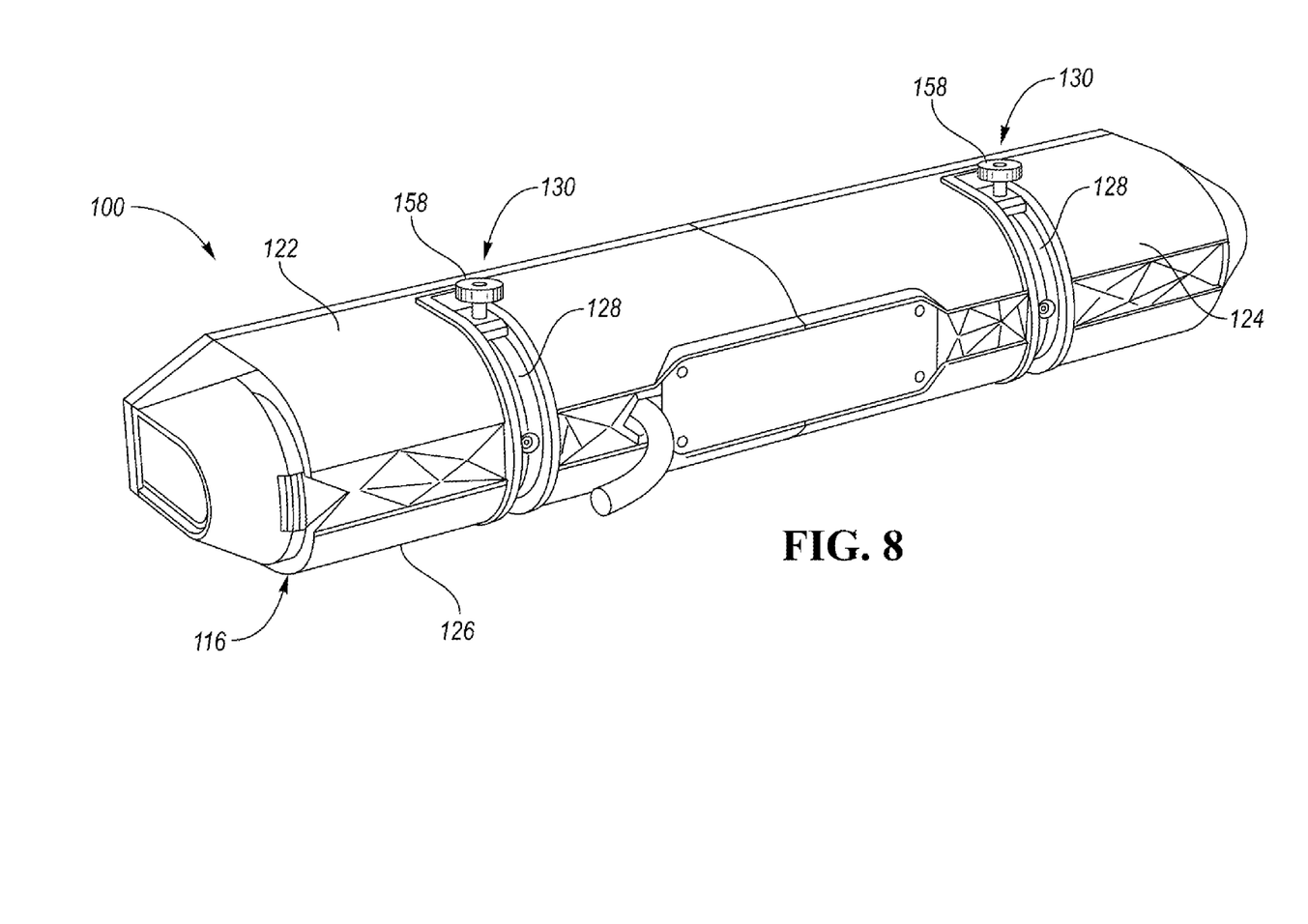
FIG. 8 is a rear perspective view of the soundbar of FIG. 7.

FIGS. 7 and 8 are front and rear perspective views, respectively, of the soundbar 100 according to one or more embodiments. The soundbar 100 includes a housing 116 having an open front side 118 through which the speaker grill 120 may be visible. The housing 116 further includes a top side 122, a rear side 124, and a bottom side 126. As best shown in FIG. 8, at least the rear side 124 may have a curved shape such that the housing 116 resembles a cylinder. At least one track 128 is formed in the housing 116 to extend at least partially around the housing 116, such as from the top side 122, along the rear side 124, to the bottom side 126. In one or more embodiments, two spaced tracks 128 are formed in the housing 116. The housing 116 may be constructed from of a metallic or plastic material, for example. Although a particular shape and configuration of the soundbar 100 and its housing 116 are shown and described herein, it is understood that the soundbar 100 and housing 116 could have a different shape and dimensions for cooperating with the mounting kit 108 and is not limited to the embodiment shown herein.

Figures 12A, 12B:
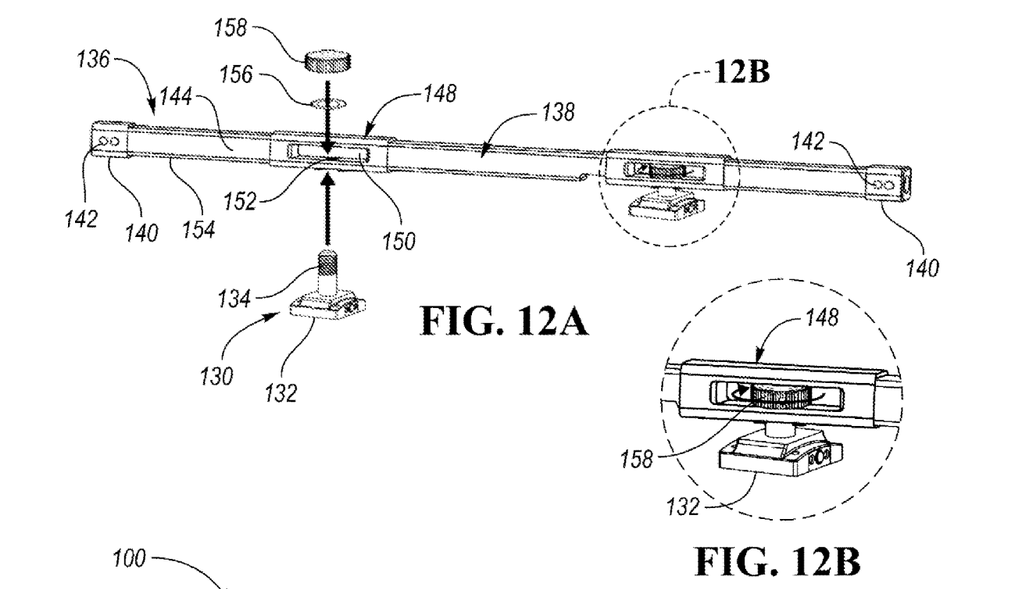
FIG. 12A is a perspective view of the tube illustrating the bolts being received therein.
FIG. 12B is an enlarged view of portion 12B of FIG. 12A.

With continued reference to FIGS. 7-8 and also with reference to FIGS. 12A-12B, the mounting kit 108 includes bolts 130 which are arranged to be coupled to the housing 116 of the soundbar 100. Each bolt 130 includes a head 132 and a shank 134 which is at least partially threaded. The head 132 may have a flat square or rectangular configuration and is sized to be received within the track 128, such as at the bottom side 126, and retained within and slidable along the track 128.

The mounting kit 108 further includes a tube 136 as illustrated in FIGS. 3-6 and 9. The tube 136 may comprise a hollow, elongated body 138 with a square or rectangular cross-section, but is not limited to this configuration. The tube 136 includes end portions 140 which may have a greater thickness compared with the body 138 for reinforced strength. The end portions 140 each have one or more end portion apertures 142 formed in a front surface 144 and a rear surface 146 of the tube 136 which are arranged to receive fasteners for securing the tube 136 within the mounting kit 108, as described further below. The tube 136 further includes one or more chambers 148 spaced along the body 138 each having a window 150 which is accessible during installation. The window 150 may be on the front surface 144, the rear surface 146, or both the front and rear surfaces 144, 146 of the tube 136. In one or more embodiments, two chambers 148 are provided and spaced to align with a spacing of the tracks 128 on the housing 116. The chambers 148 may also have a reinforced, greater thickness compared with the body 138. A chamber aperture 152 is located on a bottom surface 154 of the tube 136 aligned with each chamber 148 and sized to receive the shank 134 of the bolt 130, as illustrated in FIGS. 12A and 12B.

Figure 13A:
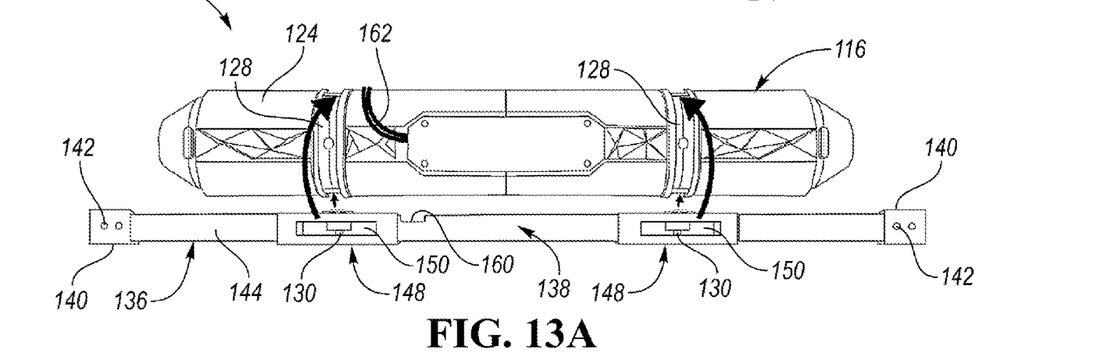
FIGS. 13A and 13B illustrate coupling of the soundbar to the tube.
Figure 13B:
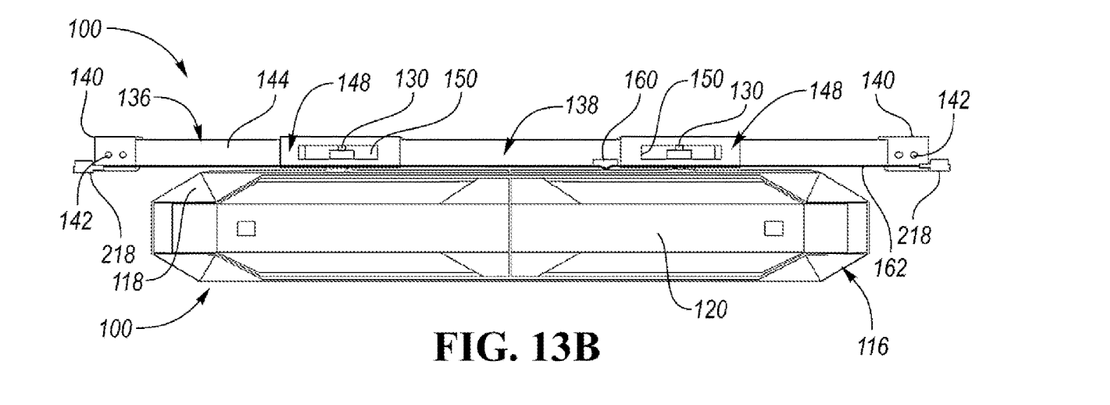
Figure 14:
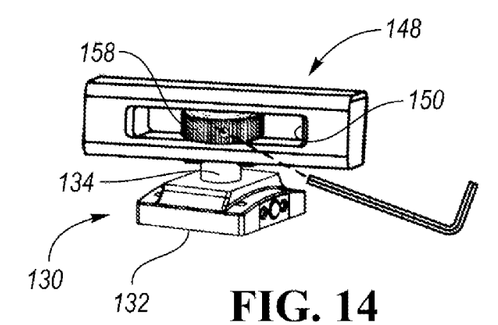
FIG. 14 is an enlarged, partial perspective view of the bolt and adjustment cap in the chamber of the tube.
Figure 15:
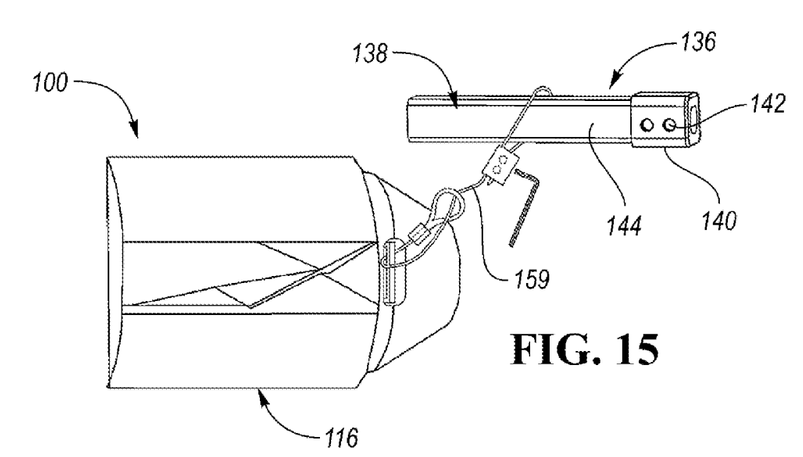
FIG. 15 is a cutaway view of an end of the soundbar secured near an end of the tube.

FIGS. 12A, 12B, 13A, 13B, and 14 illustrate securing the bolts 130 to the tube 136 and the soundbar 100 to the assembled bolts 130 and tube 136. With the shank 134 of each bolt 130 received in each chamber aperture 152, a lock washer 156 may optionally be placed on the shank 134 and then an adjustment cap 158 may be received on the shank 134. The adjustment cap 158 may be generally disk-shaped can be tightened on the shank 134 by engaging the adjustment cap 158 through the window 150 and rotating the adjustment cap 158, such as with an Allen wrench (FIG. 14). The head 132 of each bolt 130 can then be inserted into the tracks 128 on the housing 116 of the soundbar 100. For example, as best shown in FIGS. 13A and 13B, the heads 132 may be inserted into the tracks 128 at the bottom side 126 of the housing 116 and slid along the tracks 128 to the top side 122 of the housing 116. The adjustment caps 158 may be further tightened once the soundbar 100 is assembled on the tube 136. Once mounted to the tube 136, a stop member (not shown) may be inserted in each track 128 to prevent the bolt 130 from disengaging from the track 128 and thus prevent accidental disengagement of the soundbar 100 from the tube 136. FIG. 15 illustrates an end of the soundbar 100 optionally additionally secured to the tube 136 with a retention wire 159.

Figure 9:
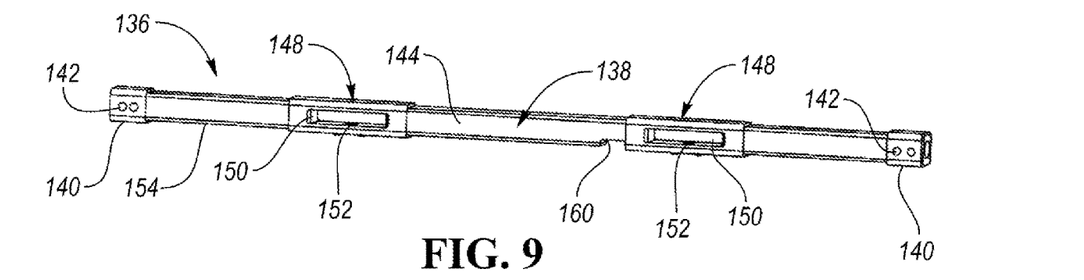
FIG. 9 is a perspective view of a tube of the mounting kit according to one or more embodiments.

The tube 136 may include a notch 160 formed in the bottom surface 154 of the body 138. The notch 160 may have an off-center location along the tube 136, such as toward a right or driver's side of the vehicle 104, 106 when installed, adjacent one of the chambers 148. The notch 160 is arranged to receive the speaker wires 162 from the rear side 124 of the soundbar 100 so that the speaker wires 162 have a space to pass under the tube 136. The notch 160 allows the soundbar 100 to rotate when desired without impinging the speaker wires 162, such that the soundbar 100 may rotate freely through a large angular excursion (e.g., 180 degrees) while the soundbar 100 is assembled to the tube 136 without requiring disassembly. The accommodation of the speaker wires 162 by the notch 160 also allows for close positioning of the soundbar 100 to the tube 136. Without the notch 160, it might be necessary to space the soundbar 100 farther downward from the tube 136 to provide space for the speaker wires 162, which could impede rear occupant head space.

Figure 10:
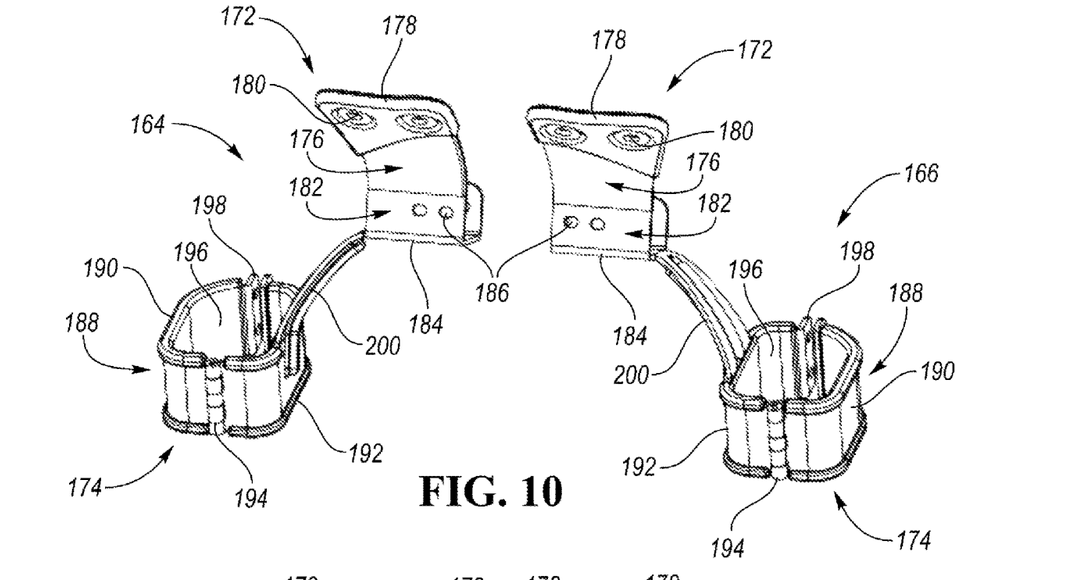
FIG. 10 is a perspective view of a first bracket and a second bracket of the mounting kit for the exemplary first vehicle.
Figure 11:
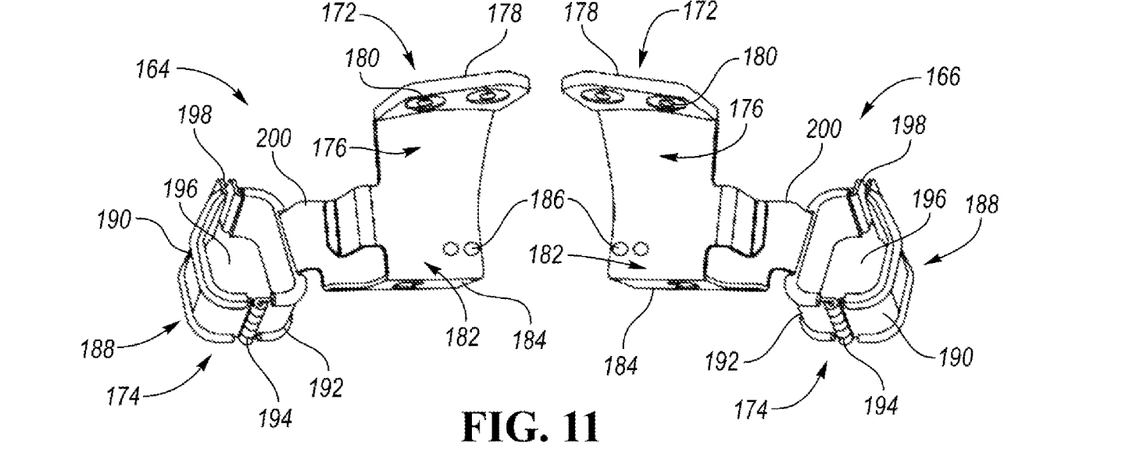
FIG. 11 is a perspective view of a first bracket and a second bracket of the mounting kit for the exemplary second vehicle.

The mounting kit 108 further includes a first bracket 164 and a second bracket 166. FIG. 10 depicts first and second brackets 164, 166 for the exemplary first vehicle 104, and FIG. 11 depicts first and second brackets 164, 166 for the exemplary second vehicle 106. The first bracket 164 may be a left bracket, and the second bracket 166 may be a right bracket, where the second bracket 166 may be a mirror image of the first bracket 164. In one or more embodiments, the first bracket 164 may be arranged to be secured to a first end 168 of the cross member 110 and to the first pillar 112, and the second bracket 166 may be arranged to be secured to a second end 170 of the cross member 110 and the second pillar 114 for mounting the soundbar 100 in the vehicle 104, 106.

The first bracket 164 and the second bracket 166 each have an inboard portion 172 and an outboard portion 174. The inboard portion 172 includes a plate 176 with a top end 178 having one or more plate apertures 180 for receiving fasteners to secure the inboard portion 172 to the cross member 110. The top end 178 may be curved in a first, forward direction, such as to facilitate mounting to the cross member 110. The inboard portion 172 further includes a cradle 182 at a bottom end 184 of the plate 176 for receiving the end portion 140 of the tube 136. The cradle 182 may be generally U-shaped and have one or more cradle apertures 186 formed therein. The cradle apertures 186 may be aligned with the end portion apertures 142 of the tube 136 for securing the tube 136 to the first bracket 164 and the second bracket 166. The U-shaped cradle 182 may extend in a second, rearward direction opposite the first direction of the top end 178 such that the cradle 182 is disposed farther toward the rear of the vehicle when the mounting kit 108 is installed.

With continued reference to FIGS. 10-11, the outboard portion 174 includes a cuff or clamp 188 having a first arm 190 and a second arm 192 connected at one end by a hinge 194. The first and second arms 190, 192 may each be generally C-shaped and define a cavity 196 therebetween which is sized to receive one of the first and second pillars 112, 114. The first and second arms 190, 192 each terminate in a flange 198 where they may be secured together with fasteners once in place around the first pillar 112 or second pillar 114. The clamps 188 may each include a rubber gasket (not shown) on an inner surface of the first and second arms 190, 192 to help prevent damage to the first and second pillars 112, 114 when the first and second brackets 164, 166 are installed and to damp any vibration caused by these components during operation of the vehicle. The outboard portion 174 may further include a connecting member 200 joining the inboard portion 172 to the clamp 188.

Figure 16:
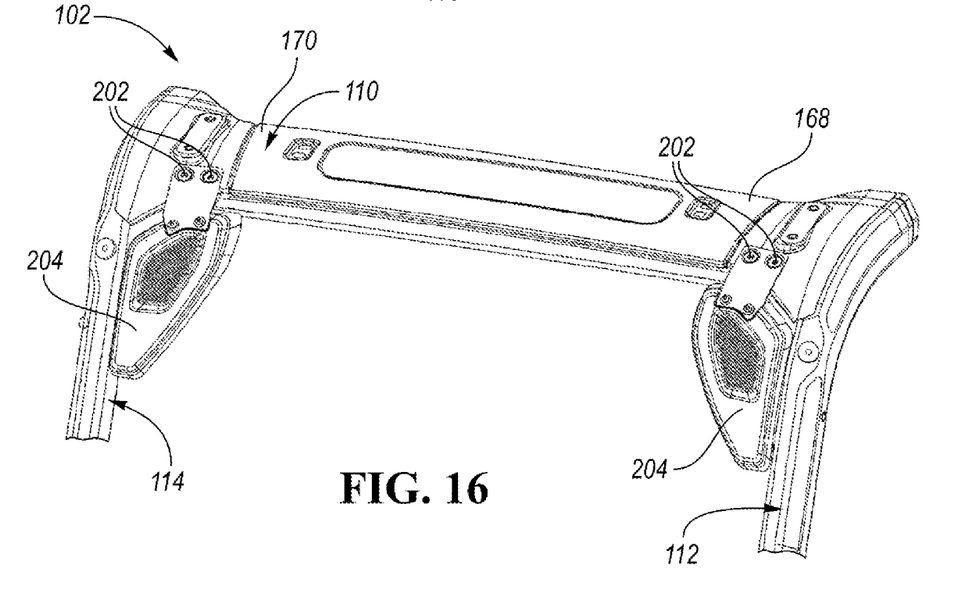
FIG. 16 is a perspective view of factory fastener locations in the exemplary first vehicle which may be removed to install the mounting kit according to one or more embodiments.

The first and second brackets 164, 166 may have mounting points over factory fastener locations in the vehicle. FIG. 16 is a perspective view illustrating the location of factory fasteners 202 in the exemplary first vehicle 104 which may be removed to install the mounting kit 108 according to one or more embodiments. The factory speakers 204 may also be removed, and the factory speaker connectors (not shown) disconnected.

Figure 17:
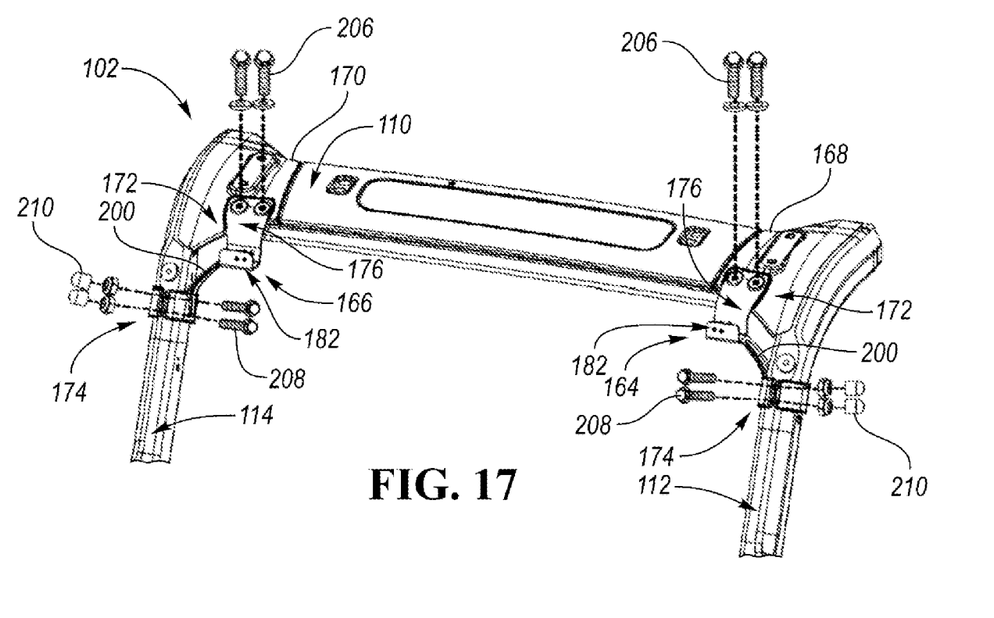
FIG. 17 is a rear perspective view illustrating installation of the first and second brackets of FIG. 10 in the exemplary first vehicle.

FIG. 17 is a rear perspective view illustrating installation of the first and second brackets 164, 166 of FIG. 10 in the exemplary first vehicle 104. The inboard portion 172 of each bracket 164, 166 is secured onto the cross member 110 (such as the rear side of the cross member 110 as shown) with fasteners 206 through the plate apertures 180 at the top end 178 of the plate 176. The clamps 188 may be opened via the hinge 194 and closed around the first and second pillars 112, 114. The clamps 188 may be secured to the first and second pillars 112, 114 via fasteners 208 at the flanges 198, and rubber tips 210 may be applied any protruding portion of the fasteners 208.

Figure 18:
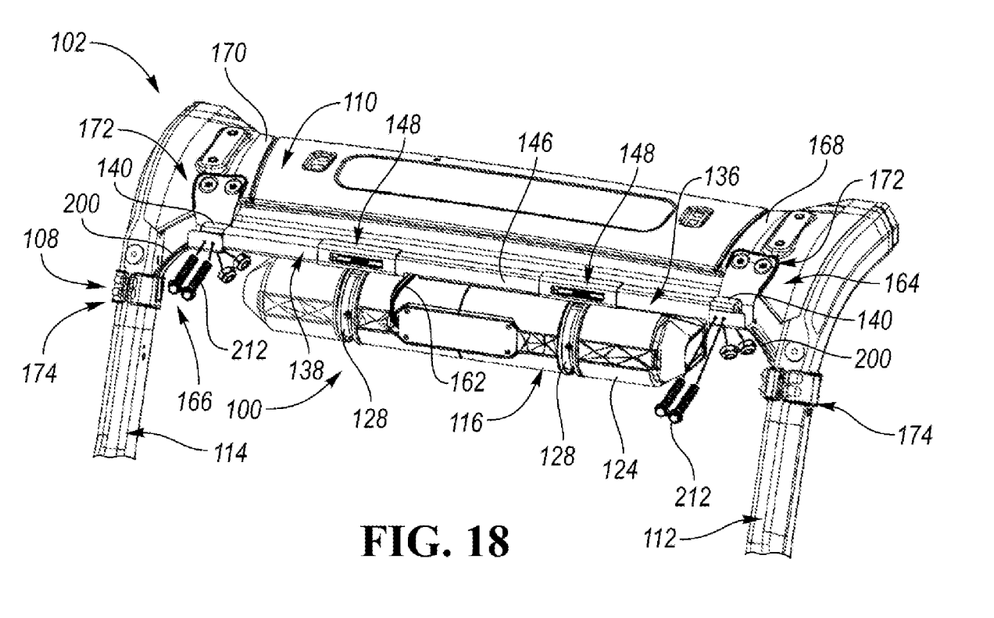
FIG. 18 is a rear perspective view illustrating installation of the tube and attached soundbar on the mounted first and second brackets of FIG. 17.

FIG. 18 is a rear perspective view illustrating installation of the tube 136 and attached soundbar 100 on the mounted first and second brackets 164, 166. The end portions 140 of the tube 136 may be placed into the cradles 182 and secured with fasteners 212 through the cradle apertures 186 and aligned end portion apertures 142 on both sides of the cradles 182. The process for installing the mounting kit 108 and soundbar 100 is the same for the exemplary second vehicle 106 as shown and described herein for the exemplary first vehicle 104.

Figure 19:
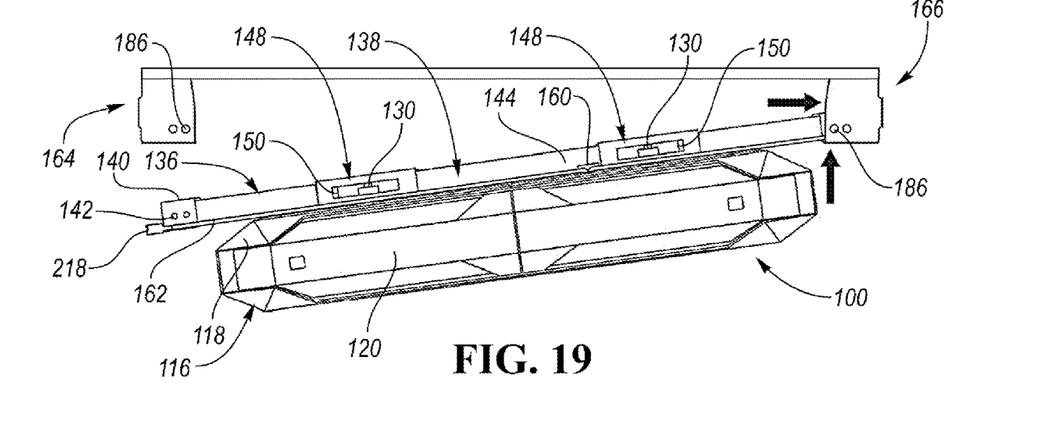
FIG. 19 is a front view illustrating installing the tube and attached soundbar by inserting an end portion of the tube in one of the first or second bracket.
Figure 20:
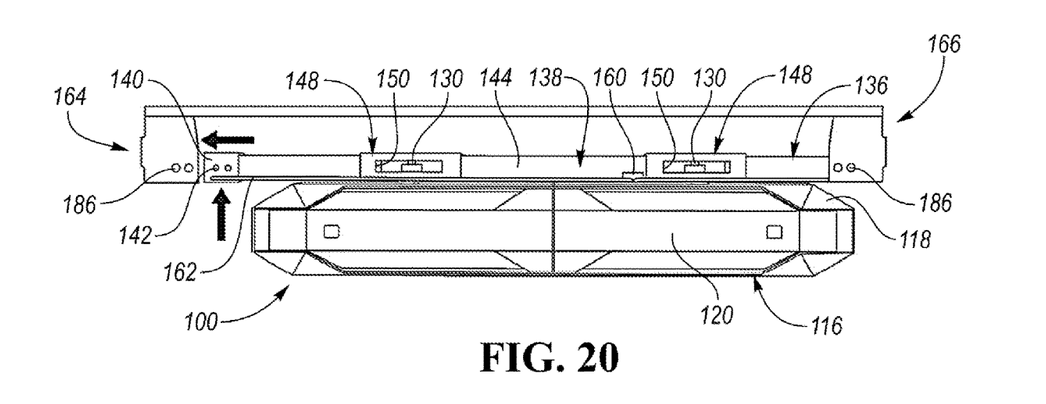
FIG. 20 is a front view illustrating installing the tube and attached soundbar by inserting an opposite end portion of the tube in the other of the first or second bracket.

As illustrated in FIGS. 19-20, in some vehicles (e.g., vehicles with a roof bow) it may be necessary or desirable to mount the soundbar 100 by tilting the tube 136 and inserting one end portion 140 into the cradle 182 of one of the first or second brackets 164, 166, then raising up the tube 136 and sliding the other end portion 140 into the cradle 182 of the other of the first or second brackets 164, 166. The position of the tube 136 can be adjusted until the soundbar 100 is centered between the first and second brackets 164, 166 and the end portion apertures 142 and the cradle apertures 186 of the first and second brackets 164, 166 are aligned.

Figure 21:
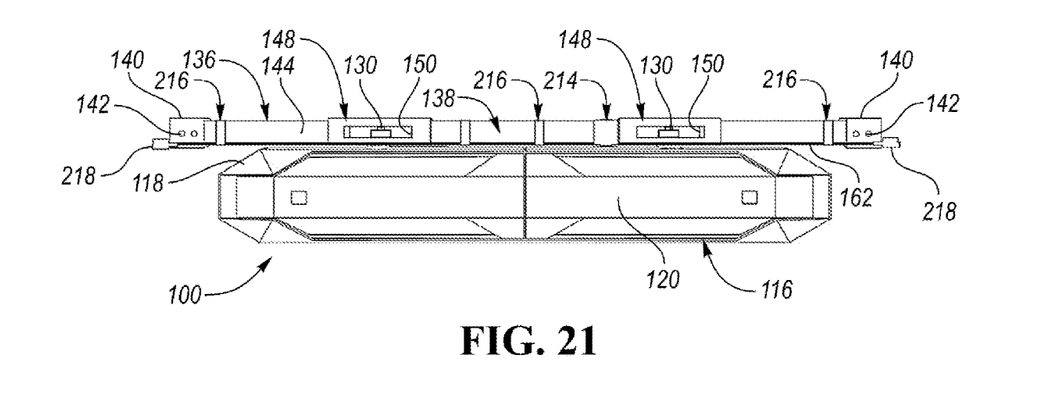
FIG. 21 is a front view of the tube and attached soundbar illustrating the location of the speaker wires and straps securing the speaker wires to the tube.

FIG. 21 is a front view of the tube 136 and attached soundbar 100 illustrating possible securing locations of the speaker wires 162. The speaker wires 162 may be routed from the rear side 124 of the soundbar 100 through the notch 160 in the tube toward the right (driver side) and left (passenger side) of the vehicle. A strap 214, such as including a hook and loop material like VELCRO®, may be secured around the tube 136 at the notch 160 to keep the speaker wires 162 aligned and prevent twisting or damage. Additional straps 216 may be used in various locations along the tube 136 to secure the speaker wires 162 to the tube 136. In one or more embodiments, the speaker wires 162 have connectors 218 on each end thereof which may be plugged into the factory speaker connectors (not shown), such as previously connected to the removed factory speakers 204, to connect the soundbar 100 to the vehicle audio system.

The mounting kit 108 securely mounts the soundbar 100 so that shock or force encountered during operation of the vehicle will not dislodge the soundbar 100 from the roll cage 102. Unlike prior art C-clamps which had to encircle the cross member 110, the first and second brackets 164, 166 described herein may be mounted to any diameter or size of cross member 110 with the resulting position of the soundbar 100 close to the cross member 110. The mounting kit 108 and method provide optimal placement of the tube 136 and attached soundbar 100 behind and above the rear seats 109 while avoiding any interference with the deployment of side curtain air bags.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A mounting kit for installing a soundbar in a vehicle, the vehicle having a roll cage including a cross member and a first pillar and a second pillar connected to opposite ends of the cross member, the mounting kit comprising:
   a tube having a hollow elongated body extending between end portions, the body including at least one chamber having a window;
   at least one bolt having a head and a shank, the head arranged to be coupled to the soundbar and the shank arranged to be received in the at least one chamber and accessible through the window to secure the soundbar to the tube; and
   a first bracket arranged to be secured to the cross member and to the first pillar, and a second bracket arranged to be secured to the cross member and the second pillar, each of the first and second brackets having a cradle arranged to receive one of the end portions of the tube for installing the tube and attached soundbar in the vehicle.

2. The mounting kit of claim 1, further comprising an adjustment cap arranged to be received on the shank within the at least one chamber, wherein the adjustment cap is adjustable by engaging the adjustment cap through the window.

3. The mounting kit of claim 1, wherein each of the end portions has one or more end portion apertures formed therein and the cradle has one or more cradle apertures formed therein, the cradle apertures arranged to be aligned with the end portion apertures for receiving fasteners and securing the tube to the first bracket and the second bracket.

4. The mounting kit of claim 1, wherein the first bracket is a left bracket and the second bracket is a right bracket, where the second bracket is a mirror image of the first bracket.

5. The mounting kit of claim 1, wherein the first bracket and the second bracket each have an inboard portion including a plate with a top end having one or more plate apertures for receiving fasteners to secure the inboard portion to the cross member, and a bottom end including the cradle.

6. The mounting kit of claim 1, wherein the first bracket and the second bracket each have an outboard portion including a clamp having a first arm and a second arm connected by a hinge, wherein the first arm and the second arm are generally C-shaped and define a cavity therebetween, wherein the first and second arms are arranged to receive fasteners to secure the clamp around the first pillar or the second pillar.

7. The mounting kit of claim 1, wherein the tube includes a notch formed in a bottom surface of the body and arranged to receive speaker wires from the soundbar.

8. A soundbar assembly for a vehicle, the vehicle having a roll cage including a cross member and a first pillar and a second pillar connected to opposite ends of the cross member, the soundbar assembly comprising:
- a soundbar having a housing with at least one track formed therein; and
- a mounting kit including
  - a tube having a hollow elongated body extending between end portions, the body including at least one chamber having a window;
  - at least one bolt having a head and a shank, the head arranged to be received within and slidable along the at least one track, the shank arranged to be received in the at least one chamber and accessible through the window to attach the soundbar to the tube; and
  - a first bracket arranged to be secured to the cross member and to the first pillar, and a second bracket arranged to be secured to the cross member and the second pillar, each of the first and second brackets having a cradle arranged to receive one of the end portions of the tube for installing the tube and attached soundbar in the vehicle.

9. The soundbar assembly of claim 8, wherein the mounting kit further comprises an adjustment cap arranged to be received on the shank within the chamber, wherein the adjustment cap is adjustable by engaging the adjustment cap through the window.

10. The soundbar assembly of claim 8, wherein each of the end portions has one or more end portion apertures formed in a front surface and a rear surface of the tube and the cradle has one or more cradle apertures formed therein, the cradle apertures arranged to be aligned with the end portion apertures for securing the tube to the first bracket and the second bracket.

11. The soundbar assembly of claim 8, wherein the first bracket is a left bracket and the second bracket is a right bracket, where the second bracket is a mirror image of the first bracket.

12. The soundbar assembly of claim 8, wherein the first bracket and the second bracket each have an inboard portion including a plate with a top end having one or more plate apertures for receiving fasteners to secure the inboard portion to the cross member, and a bottom end including the cradle.

13. The soundbar assembly of claim 8, wherein the first bracket and the second bracket each have an outboard portion including a clamp having a first arm and a second arm connected by a hinge, wherein the first arm and the second arm are generally C-shaped and define a cavity therebetween, wherein the first and second arms are arranged to receive fasteners to secure the clamp around the first pillar or the second pillar.

14. The soundbar assembly of claim 8, wherein the tube includes a notch formed in a bottom surface of the body and arranged to receive speaker wires from the soundbar.

15. A method for installing a soundbar in a vehicle, the vehicle having a roll cage including a cross member and a first pillar and a second pillar connected to opposite ends of the cross member, the method comprising:
- providing a mounting kit including a tube having a hollow elongated body extending between end portions, the body including at least one chamber having a window, at least one bolt having a head and a shank, and a first bracket and a second bracket each having a cradle;
- coupling the head of the bolt to the soundbar and inserting the shank into the at least one chamber to secure the soundbar to the tube;
- securing the first bracket to the cross member and the first pillar and securing the second bracket to the cross member and the second pillar; and
- inserting the end portions of the tube into the cradles of the mounted first and second brackets to install the tube and attached soundbar in the vehicle.

16. The method of claim 15, further comprising providing an adjustment cap on the shank within the at least one chamber and adjusting the adjustment cap via the window to secure the soundbar to the tube.

17. The method of claim 15, further comprising aligning end portion apertures with cradle apertures for receiving fasteners and securing the tube to the first bracket and the second bracket.

18. The method of claim 15, wherein the first bracket and the second bracket each have an inboard portion including a plate and the cradle and an outboard portion including a clamp having a first arm and a second arm connected by a hinge, wherein securing the first bracket and the second bracket includes securing the plate to the cross member and securing the clamp to the first pillar or the second pillar.

19. The method of claim 15, wherein the tube includes a notch formed in a bottom surface of the body, the method further including receiving speaker wires from the soundbar in the notch permitting rotation of the soundbar while assembled to the tube.

20. The method of claim 15, further comprising removing a plurality of factory fasteners and installing the first bracket and the second bracket at prior locations of the plurality of factory fasteners.

* * * * *